United States Patent
Bohling et al.

(10) Patent No.: US 8,546,467 B2
(45) Date of Patent: Oct. 1, 2013

(54) PROCESS FOR IMPROVING HIDING EFFICIENCY IN PIGMENT PAINTS

(71) Applicant: Rohm and Haas Company, Philadelphia, PA (US)

(72) Inventors: James Bohling, Lansdale, PA (US); Wei Gao, Fort Washington, PA (US); Qing Zhang, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/649,611

(22) Filed: Oct. 11, 2012

(65) Prior Publication Data

US 2013/0096250 A1 Apr. 18, 2013

Related U.S. Application Data

(60) Provisional application No. 61/547,260, filed on Oct. 14, 2011.

(51) Int. Cl.
*C08K 3/22* (2006.01)
*C09B 67/00* (2006.01)

(52) U.S. Cl.
USPC ............ 523/333; 523/205; 524/497; 528/490

(58) Field of Classification Search
USPC ................ 523/333, 205, 220; 524/556, 497, 524/547; 528/490
See application file for complete search history.

(56) References Cited

U.S. PATENT DOCUMENTS 3,772,046 A * 11/1973 Knapp et al. .................. 106/448
6,080,802 A 6/2000 Emmons et al.

* cited by examiner

*Primary Examiner* — Hannah Pak
(74) *Attorney, Agent, or Firm* — Reid S. Willis

(57) ABSTRACT

The present invention relates to a process comprising the steps of a) contacting an aqueous dispersion of a $TiO_2$ slurry containing adsorbing dispersant with an adsorbing latex to form a mixture, wherein the pH of the mixture of the $TiO_2$ slurry and adsorbing latex are sufficiently high to inhibit interaction between the $TiO_2$ and the adsorbing dispersant; then b) lowering the pH of the mixture of step a) sufficiently to promote interaction between the $TiO_2$ and the adsorbing latex, thereby forming a composite; wherein the adsorbing latex comprises structural units of itaconic acid or a salt thereof. The process of the present invention provides for improved hiding and reduced grit for coatings compositions.

7 Claims, No Drawings

PROCESS FOR IMPROVING HIDING EFFICIENCY IN PIGMENT PAINTS

BACKGROUND OF THE INVENTION

The present invention relates to a process for improving hiding efficiency in pigmented paints. Latex binders that adsorb to $TiO_2$ are known to form composites with $TiO_2$, leading to greater pigment efficiency in paint films. It is possible to use the adsorbing polymer as a portion of the binder in the paint (pre-composite) to maximize hiding and to use a second non adsorbing (let-down) binder to achieve other desired properties and to reduce cost. One of the problems often observed with current pre-composite technology, particularly pre-composites prepared using highly reactive functional monomers such as phosphoethylmethacrylate (PEM), is formation of grit occurring during the preparation of the composite and arising from the uncontrolled reaction of the reactive pre-composite with $TiO_2$. To control grit, the formulator must carefully mix the adsorptive latex with the pigment under controlled conditions to avoid flocculation, which often requires expensive high shear mixing.

Alternatively, grit can be controlled using less reactive pre-composites, for example, pre-composites prepared from less reactive monomers such as itaconic acid; unfortunately, coatings formulations made from these pre-composites exhibit significantly less hiding than coatings made from the more reactive pre-composites. Therefore, it would be an advantage to reduce grit formation and improve hiding in formulations that include latex binder and $TiO_2$, in a controlled and cost-effective manner.

SUMMARY OF THE INVENTION

The present invention addresses a need in the art by providing a process comprising the steps of a) contacting an aqueous dispersion of a $TiO_2$ slurry containing adsorbing dispersant with an adsorbing latex to form a mixture, wherein the pH of the mixture of the $TiO_2$ slurry and adsorbing latex are sufficiently high to inhibit interaction between the $TiO_2$ and the adsorbing dispersant; then b) lowering the pH of the mixture of step a) sufficiently to promote interaction between the $TiO_2$ and the adsorbing latex, thereby forming a composite; wherein the adsorbing latex comprises structural units of itaconic acid or a salt thereof. The process of the present invention provides for better hiding and reduced grit for coatings compositions.

DETAILED DESCRIPTION OF THE INVENTION

The present invention is a process comprising the steps of a) contacting an aqueous dispersion of a $TiO_2$ slurry containing adsorbing dispersant with an adsorbing latex, wherein the pH of the mixture of the $TiO_2$ slurry and the adsorbing latex are sufficiently high to inhibit interaction between the $TiO_2$ and the adsorbing dispersant; then b) lowering the pH of the composition of step a) sufficiently to promote interaction between the $TiO_2$ and the adsorbing latex, thereby forming a composite; wherein the adsorbing latex comprises structural units of itaconic acid or a salt thereof.

In the first step, an aqueous dispersion of $TiO_2$ and the dispersant ($TiO_2$ slurry) are contacted with an adsorbing latex (also referred to as pre-composite). The pH of the $TiO_2$ slurry is pre-adjusted with a suitable base from its nominal level, typically from about 7.5 to 9, to a level sufficiently high to inhibit interaction between the $TiO_2$ and the subsequently added adsorbing dispersant, preferably, to a pH of from about 10 to about 12. The mixture is advantageously maintained at this advanced pH for a sufficient time to remove at least some of the dispersant adsorbed on the surface of the $TiO_2$ particles; depending on the nature of the dispersant, and the surface properties of the $TiO_2$, this delay time is generally from about 10 minutes to about 24 hr, though longer delay times may be used. After a suitable delay time, the pH is then lowered back to a desired level, generally to between 8.5 and 9.

The pH of the adsorbing latex is also at or raised to a level so that the latex, when contacted with the $TiO_2$ slurry, results in a mixture having a pH sufficiently high to inhibit interaction between the $TiO_2$ and the adsorbing latex. Thus, for example, an adsorbing latex at pH ~10 can be mixed with a $TiO_2$ slurry at pH ~10 to achieve the desired affect; it is also possible to achieve the same result by mixing an adsorbing latex having a relatively low pH (~8.5) with a $TiO_2$ slurry having a relatively high pH (~12), so long as the resulting mixture has a pH sufficiently high to inhibit interaction between the $TiO_2$ particles and the adsorbing latex.

The base used to raise the pH can be organic or inorganic. Examples of suitable organic bases include alkanol amines such as 2-amino-2-methyl-1-propanol and 2-amino-2-ethyl-1,3-propane-diol; examples of suitable inorganic bases include alkali metal and alkaline earth hydroxides and carbonates such as NaOH, KOH, and $Na_2CO_3$. Ammonia is also a suitable base.

Suitable pre-composites include acrylic, styrene-acrylic, vinyl ester, and ethylene-vinyl ester containing latexes. Acrylic latexes preferably contain structural units of acrylates and methacrylates such as methyl methacrylate, ethyl methacrylate, ethyl acrylate, butyl acrylate, and ethyl hexyl acrylate and combinations thereof. Preferred vinyl ester latexes are vinyl acetate latexes; preferred vinyl ester-ethylene latexes are vinyl acetate-ethylene latexes.

The term "structural units" is used to refer to the groups formed from the polymerization of the corresponding monomer. Structural units of methyl methacrylate and itaconic acid are as illustrated:

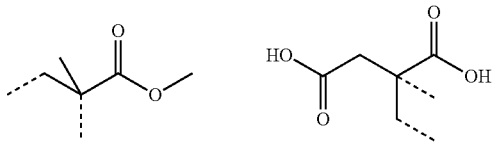

structural unit of methyl methacrylate   structural unit of itaconic acid where the dotted lines indicate the points of connectivity to the polymer backbone.

The pre-composite further includes structural units of itaconic acid or itaconic acid salt adsorbing moieties pendant to the polymer backbone that adsorbs to the surface of the $TiO_2$ particles. Preferably, the concentration of structural units of itaconic acid or itaconic acid salt groups is in the range of from 0.5 to 5 weight percent, more preferably to 3 weight percent based on the weight of the pre-composite. It is understood that $TiO_2$ particles may be surface treated with metal oxides such as alumina, silica, and zirconia oxides and combinations thereof. Thus, the adsorptivity of the surface of the $TiO_2$ particles varies with the nature of the surface treatment.

$TiO_2$ is generally supplied as a powder, which is rendered into an aqueous dispersion, or as an aqueous slurry. In either case, a dispersant, which adsorbs to the surface of the $TiO_2$, is generally used to stabilize the pigment particles. The adsorbed particles disadvantageously prevent adsorption of adsorbing latex particles (pre-composite particles) that are blended with the slurry to improve hiding efficiency.

An increase in pH appears to provide a mechanism for removing dispersant from the surface of the $TiO_2$ particles where dispersant removal is desired. Thus, when the latex is added to the high pH slurry, the latex particles can out-compete the dispersant for adsorption to the surface of the $TiO_2$ particles once the pH is lowered sufficiently to promote adsorption; this phenomenon occurs because the latex particles have a greater affinity than the dispersant for the $TiO_2$. The pH can be lowered with a suitable acid, for example citric acid; however, if the base used to raise the pH is volatile (e.g., ammonia), it would be possible to lower pH with an acid or by allowing the base to evaporate or boil off. Using the process of the present invention wherein a less reactive pre-composite polymer that contains structural units of itaconic acid results in very little (if any) grit and a surprising improvement in hiding as compared to processes that do not involve contacting a $TiO_2$ slurry with an adsorbing latex at high pH.

The adsorbing latex is advantageously added in an amount sufficient to ensure substantially complete adsorption of the latex to the surface of the $TiO_2$ particles. If the amount of adsorbing latex is insufficient to cover the surface of the particles, undesirable flocculation may result. Thus, some amount of free adsorbing latex is preferably present in the ultimate composite.

The composite prepared by the process of the present invention can be formulated with any of a number of suitable components to make a coating composition (such as a paint), including solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

EXAMPLES

The following examples are for illustrative purposes only and are not intended to limit the scope of the invention.

Intermediate 1

Preparation of Pre-Composite Polymer from Itaconic Acid

A stage 1 monomer emulsion (ME1) was prepared by mixing DI water (346.0 g), sodium laureth sulfate (36.0 g, 31% active), butyl acrylate (BA, 689.8 g), methyl methacrylate (MMA 484.1 g), and a 50% aqueous solution of ureido methacrylate (UMA, 24.6 g). A stage 2 monomer emulsion (ME2) was prepared by mixing DI water (200.0 g), sodium laureth sulfate (21.5 g, 31% active), BA (370.35 g), MMA (292.05 g), and a 50% aqueous solution of UMA (13.25 g). A 5-liter reactor, four-necked round bottom flask equipped with a paddle stirrer, a thermocouple, nitrogen inlet, and reflux condenser was assembled. DI water (800.0 g), sodium laureth sulfate (3.50 g, 31% active), and itaconic acid (37.9 g) was added to the flask and stirring was initiated. The contents of the flask were heated to 80° C. under a nitrogen atmosphere, whereupon a portion of ME1 (47.5 g) was added to the kettle followed by a DI water rinse (30 g). The contents were stirred for 1 min, after which time a solution of APS (0.45 g) in DI (10 g) water was added, followed by addition of a solution of Bruggolite FF6 reducing agent (0.45 g) in 10 g DI water, then a solution of iron sulfate heptahydrate (0.02 g) and ethylenediaminetetraacetic acid, tetrasodium salt (0.013 g) in DI water (22.3 g). After another 3 min, the remainder of ME1 was added to the flask over 64 min. Concurrently, solutions of ammonium persulfate (APS, 1.65 g) and t-butylhydroperoxide (t-BHP, 1.90 g) in DI water (101.5 g) and Bruggolite FF6 reducing agent (2.20 g) in DI water (103.5 g) were fed separately to the flask at a rate of 1.0 g/min. After completion of ME1 feed, DI water (25 g) was added as a rinse. ME2 was then added to the flask over 30 min, after which time the vessel containing ME2 was rinsed with DI water (25 g), which was then added to the flask. The contents of the flask were maintained at 79 to 81° C. during the additions. The batch was then cooled during which time a redox pair was added to the kettle. After completion of addition of the redox pair, and when the temperature has reached the range 30 to 40° C., a solution of aqueous ammonia (23.8 g, 28% concentrated) in DI water (23.8 g) was added, followed by the addition of a biocide. The particle size was found to be 152 nm and solids of 49.3% with a pH of 8.0.

Intermediate 2

Preparation of Pre-Composite Polymer from Methacrylic Acid

A stage 1 monomer emulsion (ME1) was prepared by mixing DI water (346.0 g), sodium laureth sulfate (36.0 g, 31% active), BA (689.8 g), MMA (484.1 g), methacrylic acid (MAA, 32.6 g), and a solution of UMA (24.6 g, 50% aqueous). A stage 2 monomer emulsion (ME2) was prepared by mixing DI water (200.0 g, 21.5 g, 31% active), sodium laureth sulfate, BA (370.35 g), MMA (292.05 g), MAA (17.55 g), and UMA (13.25 g of a 50% aqueous solution). To a 5-liter, four-necked round bottom flask equipped with a paddle stirrer, a thermocouple, nitrogen inlet, and reflux condenser was added, with stirring, DI water (800.0 g) and sodium laureth sulfate (3.50 g, 31% active). The contents of the flask were heated to 80° C. under a nitrogen atmosphere, and a portion of ME1 (47.5 g) was added to the kettle followed by a DI water rinse (30 g). The contents were stirred for 1 min, after which time a solution of APS (0.45 g) in DI water (10 g) was added, followed by addition of a solution of Bruggolite FF6 reducing agent (0.45 g) in DI water (10 g), then by addition of a solution of iron sulfate heptahydrate (0.02 g) and ethylenediaminetetraacetic acid tetrasodium salt (0.013 g), in DI water (22.3 g). After another 3 min, the remainder of ME 1 was added to the flask over 64 min. Concurrently, solutions of APS (1.65 g) and t-BHP (1.90 g) in DI water (101.5 g) and Bruggolite FF6 reducing agent (2.20 g) in DI water (103.5 g) were fed separately to the flask at a rate of 1.0 g/min. After completion of the addition of the remainder of the ME1 feed, DI water (25 g) was added as a rinse. ME2 was then added to the flask over 30 min, after which time, DI water (25 g) was added as a rinse. The contents of the flask were maintained at 79 to 81° C. during the additions. The batch was then cooled during which time a redox pair was added to the kettle. After completion of addition of the redox pair, and when the temperature has reached the range 30 to 40° C., a solution of aqueous ammonia (23.8 g, 28% concentrated) in DI water (23.8 g) was added, followed by the addition of a biocide. The particle size was found to be 112 nm and solids of 48.6% with a pH of 8.0.

Example 1 and Comparative Examples 1 to 3 pH Studies of Formulations

Table 1 shows the recipes for the ingredients used to make paints for Example 1 and Comparative Example 1, which use a precomposite polymer having structural units of itaconic acid (IA), and Comparative Examples 2 and 3, which use a precompsosite polymer having structural units of methacrylic acid (MAA).

For Example 1, $TiO_2$ slurry (Ti-Pure R-746 slurry) was adjusted to pH 11 with AMP™-95 2-Amino-2-methyl-1-propanol (A Trademark of The Dow Chemical Company or its Affiliates). The slurry was held at pH 11 overnight (~18 h), after which time the slurry was added to a mixture of the pre-composite polymer, defoamer (Foamstar A-34 defoamer), and water with mixing speed of 500 rpm. After mixing for 5 min, the slurry/pre-composite mixture was then neutralized with 10% citric acid to pH 8.0 and diluted with water to form a composite.

A portion of the composite was added with mixing to a separate vessel containing acrylic emulsion (RHOPLEX™ VSR-1050LOE Acrylic Emulsion, A Trademark of The Dow Chemical Company or its Affiliates). Extender grind (a mixture of water; dispersant (Tamol 165A dispersant); surfactant (BYK-348 surfactant); defoamer (Foamstar A-34 defoamer); and extender (Minex 10 extender)), was then added to the vessel, followed by opaque polymer (ROPAQUE™ Ultra E Opaque Polymer, (A Trademark of The Dow Chemical Company or its Affiliates), and coalescent (Optifilm Enhancer 400 coalesecent), each prepared in the amounts and in the order shown in Table 1. The paint was then adjusted to pH 8.8 by adding 5% KOH. RM1 (ACRYSOL™ RM-2020 NPR Rheology Modifier, A Trademark of The Dow Chemical Company or its Affiliates), RM2 (ACRYSOL™ RM-8W Rheology Modifier), and water were then added to make the paint.

Comparative Example 1 was prepared substantially as described for Example 1 except that the pH of the $TiO_2$ slurry was not adjusted with base from as-supplied level of 8.5; therefore, no citric acid was used to neutralize the composite. Comparative Example 2 were prepared by the procedure described for Example 1, and Comparative Example 3 were prepared by the procedure described for Comparative Example 1, except that the MAA containing pre-composite polymers were used instead of IA containing pre-composite polymers.

TABLE 1

Paint Formulations

| Ingredients (g) | Ex. 1 | Comp. Ex. 1 | Comp. Ex. 2 | Comp. Ex. 3 |
|---|---|---|---|---|
| Acrylic Emulsion Composite Stage | 31.23 | 31.23 | 31.84 | 31.84 |
| Pre-Composite Polymer (IA) | 196.43 | 196.43 | 0 | 0 |
| Pre-Composite Polymer (MAA) | 0 | 0 | 200.22 | 200.22 |
| Defoamer | 0.70 | 0.70 | 0.70 | 0.70 |
| Water | 38.84 | 62.1 | 38.84 | 62.1 |
| $TiO_2$ slurry premix | | | | |
| $TiO_2$ Slurry | 140.31 | 140.31 | 140.31 | 140.31 |
| 2-Amino-2-methyl-1-propanol | 2.18 | 0 | 2.18 | 0 |
| Post-Premix Composite | | | | |
| 10% citric acid | 12.47 | 0 | 11.76 | 0 |
| Water | 8.58 | 0 | 9.29 | 0 |
| Composite Sub-total | 399.51 | 399.54 | 403.30 | 403.33 |
| Extender Grind | | | | |
| Water | 4.50 | 4.50 | 4.50 | 4.50 |
| Dispersant | 0.21 | 0.21 | 0.21 | 0.21 |
| BYK-348 Surfactant | 1.00 | 1.00 | 1.00 | 1.00 |
| Defoamer | 1.00 | 1.00 | 1.00 | 1.00 |
| Extender | 8.82 | 8.82 | 8.82 | 8.82 |
| Water | 1.50 | 1.50 | 1.50 | 1.50 |
| Extender Grind Sub-total | 17.03 | 17.03 | 17.03 | 17.03 |
| LetDown | | | | |
| Opaque polymer | 22.46 | 22.46 | 22.46 | 22.46 |
| Coalescent | 3.58 | 3.58 | 3.60 | 3.60 |
| KOH (5%) | 6.88 | 7.45 | 7.65 | 6.40 |
| RM1 | 15.40 | 15.40 | 15.40 | 15.40 |
| RM2 | 2.65 | 2.65 | 2.65 | 2.65 |
| Water | 17.06 | 16.63 | 12.61 | 13.99 |
| Totals | 515.79 | 515.95 | 516.53 | 516.69 |

Table 2 shows the hiding performances of examples listed in Table 1.

TABLE 2

Hiding of Tested Samples

| | Ex. 1 | Comp. Ex. 1 | Comp. Ex. 2 | Comp. Ex. 3 |
|---|---|---|---|---|
| Precomposite Polymer | IA | IA | MAA | MAA |
| $TiO_2$ Slurry initial pH | 11.0 | 8.5 | 11.0 | 8.5 |
| S/mil | 7.10 | 6.42 | 6.50 | 6.52 |

The results show that the formulation prepared using a $TiO_2$ slurry at an initial pH of 11.0, combined with an itaconic acid based pre-composite polymer (Example 1) gives hiding of 7.10 S/mil, a marked improvement over using a $TiO_2$ slurry at an initial pH of 8.5 (Comparative Example 1, 6.42 S/mil). In contrast, adding the high pH $TiO_2$ slurry to the pre-composite polymer made from methacrylic acid (MAA, Comparative Example 2) had no effect on hiding as compared to adding slurry with an initial pH of 8.5 (Comparative Example 3).

Kubelka-Munk S/mil Test Method

S/mil was determined for each of the final paint formulations as follows: Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The y-reflectance was measured using a BYK Gardner 45° Reflectomer in each of the scribed areas five times measuring on a diagonal starting at the top of the rectangle and the average y-reflectance recorded. A thick film draw down was prepared for each paint on Black Vinyl Charts (Leneta Form P121-10N) using a 3" 25 mil block draw down bar and the charts were allowed to dry overnight. The y-reflectance was measured in five different areas of the draw down and the average y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(\text{mils}) = \frac{W_{pf}(g) \times 1000(\text{mil/in})}{D(\text{lbs/gal}) \times 1.964(g/\text{in}^3 / \text{lbs/gal}) \times A(\text{in})}$$

The invention claimed is:

1. A process for preparing a composite comprising the steps of:
   a) contacting an aqueous dispersion of a $TiO_2$ slurry containing adsorbing dispersant with an adsorbing latex to form a mixture, wherein the pH of the mixture of the $TiO_2$ slurry and the adsorbing latex is maintained at 10 to 12 for at least 10 minutes; then
   b) lowering the pH of the mixture of step a) sufficiently to promote interaction between the $TiO_2$ and the adsorbing latex, thereby forming a composite; wherein the adsorbing latex comprises structural units of itaconic acid or a salt thereof.

2. The process of claim 1 wherein prior to step a) the pH of the $TiO_2$ slurry is raised from 7.5 to 9 to about 10 to 12.

3. The process of claim 1 wherein the adsorbing latex is an acrylic, a styrene-acrylic, a vinyl ester, or an ethylene-vinyl ester containing latex.

4. The process of claim 2 wherein the pH of the $TiO_2$ slurry is raised with an alkanol amine.

5. The process of claim 1 which further includes the step of formulating the composite into a paint composition.

6. The process of claim 1 wherein the amount of the adsorbing latex in the mixture is at a sufficient concentration with respect to $TiO_2$ to inhibit flocculation of $TiO_2$ particles.

7. The process of claim 1 which further includes the step of mixing the composite with an additive selected from the group consisting of rheology modifiers, pigments, extenders, binders dispersants, defoamers, preservatives, biocides, flow agents, and leveling agent, and combinations thereof.

* * * * *